United States Patent
Jiang et al.

(10) Patent No.: US 11,860,608 B2
(45) Date of Patent: Jan. 2, 2024

(54) INDUSTRIAL EQUIPMENT OPERATION, MAINTENANCE AND OPTIMIZATION METHOD AND SYSTEM BASED ON COMPLEX NETWORK MODEL

(71) Applicant: QILU UNIVERSITY OF TECHNOLOGY, Shandong (CN)

(72) Inventors: Xuesong Jiang, Jinan (CN); Chao Meng, Jinan (CN); Xiumei Wei, Jinan (CN); Qingcun Zhu, Jinan (CN); Dapeng Hu, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 570 days.

(21) Appl. No.: 17/042,480

(22) PCT Filed: Jan. 3, 2020

(86) PCT No.: PCT/CN2020/070187
§ 371 (c)(1),
(2) Date: Sep. 28, 2020

(87) PCT Pub. No.: WO2020/258826
PCT Pub. Date: Dec. 30, 2020

(65) Prior Publication Data
US 2023/0152786 A1    May 18, 2023

(30) Foreign Application Priority Data
Jun. 27, 2019 (CN) .......................... 201910568059.3

(51) Int. Cl.
*G05B 19/418*   (2006.01)
*G05B 23/02*    (2006.01)

(52) U.S. Cl.
CPC ..... *G05B 19/4185* (2013.01); *G05B 23/0283* (2013.01); *G05B 23/0297* (2013.01); *G05B 2223/02* (2018.08)

(58) Field of Classification Search
CPC ............ G05B 19/4185; G05B 23/0283; G05B 23/0297
See application file for complete search history.

(56) References Cited

U.S. PATENT DOCUMENTS

| 2003/0191728 A1* | 10/2003 | Kulkarni | ................ G06N 3/086 706/31 |
| 2008/0243289 A1 | 10/2008 | Yelchuru et al. | |
| 2018/0330300 A1* | 11/2018 | Runkana | ................ G05B 15/02 |

FOREIGN PATENT DOCUMENTS

| CN | 108958221 A | 12/2018 |
| CN | 109324519 A | 2/2019 |

(Continued)

OTHER PUBLICATIONS

Apr. 15, 2020 Search Report issued in International Patent Application No. PCT/CN2020/070187.

(Continued)

*Primary Examiner* — Mischita L Henson
(74) *Attorney, Agent, or Firm* — Oliff PLC

(57) ABSTRACT

The present invention discloses an industrial equipment operation, maintenance and optimization method and system based on a complex network model. The method includes the following steps: obtaining data of all sensors of industrial equipment, and calculating a Spearman correlation coefficient between data of every two of the sensors within the same time period; using each sensor as a node, and using the Spearman correlation coefficient as a weight of a network edge, to construct a fully connected weighted network; and obtaining, when an adjustment instruction for a target feature is received, a currently optimal parameter adjustment (Continued)

---

Obtain data of all sensors of industrial equipment, and calculate a Spearman correlation coefficient between data of every two of the sensors with the same time period

↓

Use each sensor as a node, and use the Spearman correlation coefficient as a weight of a network edge, to construct a fully connected weighted network

↓

Obtain, when an adjustment instruction for a target feature is received, a currently optimal parameter adjustment path of the target feature based on the fully connected weighted network path of the target feature based on the fully connected weighted network. In the present invention, production equipment in reality is digitized to construct a complex network oriented to industrial big data. An optimal path for equipment parameter tuning may be found by using the network, thereby reducing dependence of an enterprise on a domain expert.

8 Claims, 3 Drawing Sheets

(56) References Cited

FOREIGN PATENT DOCUMENTS

| | | |
|---|---|---|
| CN | 109766583 A | 5/2019 |
| CN | 110276460 A | 9/2019 |

OTHER PUBLICATIONS

Apr. 15, 2020 Written Opinion of the International Searching Authority issued in International Patent Application No. PCT/CN2020/070187.

* cited by examiner

|        | V0    | V1    | V2    | V3    | V4    | V5    | V6   | V7   | V8    | V9    |
|--------|-------|-------|-------|-------|-------|-------|------|------|-------|-------|
| V1     | 0.89  |       |       |       |       |       |      |      |       |       |
| V2     | 0.52  | 0.49  |       |       |       |       |      |      |       |       |
| V3     | 0.40  | 0.36  | 0.42  |       |       |       |      |      |       |       |
| V4     | 0.70  | 0.65  | 0.06  | 0.29  |       |       |      |      |       |       |
| V5     | -0.36 | -0.24 | -0.32 | -0.23 | -0.25 |       |      |      |       |       |
| V6     | 0.13  | 0.15  | 0.55  | 0.18  | -0.21 | 0.00  |      |      |       |       |
| V7     | 0.08  | 0.08  | 0.38  | 0.13  | -0.15 | 0.12  | 0.90 |      |       |       |
| V8     | 0.83  | 0.85  | 0.68  | 0.40  | 0.45  | -0.19 | 0.36 | 0.28 |       |       |
| V9     | -0.11 | -0.07 | -0.04 | -0.19 | -0.19 | 0.11  | 0.48 | 0.47 | -0.05 |       |
| target | 0.87  | 0.83  | 0.63  | 0.50  | 0.57  | -0.35 | 0.26 | 0.16 | 0.80  | -0.05 |

FIG.2

INDUSTRIAL EQUIPMENT OPERATION, MAINTENANCE AND OPTIMIZATION METHOD AND SYSTEM BASED ON COMPLEX NETWORK MODEL

BACKGROUND

Technical Field

The present invention relates to the field of industrial big data information mining technologies, and in particular, to an industrial equipment operation, maintenance and optimization method and system based on a complex network model.

Related Art

The description in this section merely provides background information related to the present disclosure and does not necessarily constitute the prior art.

With the continuous development of process industry, the process industry is developing towards product diversification, diversification of production stages, and diversification of production batches. In this production mode, the status of production equipment usually determines production efficiency of each production stage, and essentially determines production efficiency of the entire factory. At the same time, with the continuous improvement of requirements on the product quality and the continuous expansion of the production scale, the production mode of products is continuously improved. Therefore, the production process becomes further complex. Production complexity usually means that factories may use production equipment of different brands at the same time, and this means that the factory needs domain experts from a plurality of equipment manufacturers to separately assemble and optimize their equipment, and as a result, the development of enterprises is highly dependent on the domain expert.

The arrival of Industry 4.0 and Made in China 2050 makes industrial production increasingly intelligent. Modern industry increasingly relies on data, and a data volume in industrial production starts to enter the PB level, and this brings a qualitative change in industrial data compared with previous production data. A conventional data mining manner is no longer suitable for analysis and processing of big data.

The development of the industrial big data technology makes the production process of the enterprises more intelligent, and the manufacturing industry is gradually changing from process-driven to data-driven. The industrial big data usually has respective features in terms of a numerical value and a fluctuation range, and there is a large difference in terms of a data size and a fluctuation status. In addition, the industrial big data technology has the problems of data missing and large noise, which limits the wide application of industrial data. Also, existing data-driven models of enterprises are usually quite limited in the service aspect, and technical weaknesses beyond service experience cannot be found. An existing data-based industrial network model usually uses a conventional data mining algorithm which requires a complex construction process, and the constructed data model is not verified.

SUMMARY

To overcome the foregoing disadvantages in the prior art, the present invention provides an industrial equipment operation, maintenance and optimization method and system based on a complex network model. Production equipment in reality is digitized to construct a complex network oriented to industrial big data. An optimal path for equipment parameter tuning may be found by using the network, thereby reducing dependence of an enterprise on a domain expert.

To achieve the foregoing objective, one or more embodiments of the present invention provide the following technical solutions:

An industrial equipment operation, maintenance and optimization method based on a complex network model includes the following steps:

obtaining data of all sensors of industrial equipment, and calculating a Spearman correlation coefficient between data of every two of the sensors within the same time period;

using each sensor as a node, and using the Spearman correlation coefficient as a weight of a network edge, to construct a fully connected weighted network; and obtaining, when an adjustment instruction for a target feature is received, a currently optimal parameter adjustment path of the target feature based on the fully connected weighted network.

One or more embodiments provide an industrial equipment parameter adjustment path generation system based on a sensor network model, including:

a data obtaining module, configured to obtain data of all sensors of industrial equipment;

a network construction module, configured to calculate a Spearman correlation coefficient between data of every two of the sensors within the same time period; use each sensor as a node, and use the Spearman correlation coefficient as a weight of a network edge, to construct a fully connected weighted network; and a parameter adjustment path generation module, configured to obtain, when an adjustment instruction for a target feature is received, a currently optimal parameter adjustment path of the target feature based on the fully connected weighted network.

One or more embodiments provide an electronic device, including a memory, a processor, and a computer program stored in the memory and capable of running on the processor, when executing the program, the processor implementing the industrial equipment operation, maintenance and optimization method based on a complex network model.

One or more embodiments provide a computer-readable storage medium, storing a computer program, when executed by a processor, the program implementing the industrial equipment operation, maintenance and optimization method based on a complex network model.

The foregoing one or more technical solutions have the following beneficial effects:

In the present invention, production equipment in reality is digitized by using industrial big data, to construct a complex network oriented to the industrial big data, and various factors of the equipment are connected. By using the network, an optimal path for equipment parameter tuning may be found by traversing paths on the network, thereby reducing dependence of an enterprise on a domain expert.

In the model constructed in the present invention, a correlation between data is calculated by using a Spearman correlation coefficient. In this way, an overall distribution of data and a sample size can be well ignored, to resolve problems of the industrial big data in these aspects. In addition, the model is completely data-driven, so that an impact of service knowledge on the data model is greatly eliminated.

BRIEF DESCRIPTION OF THE DRAWINGS

The accompanying drawings constituting a part of the present invention are used to provide further understanding of the present invention. Exemplary embodiments of the present invention and descriptions thereof are used to explain the present invention, and do not constitute an improper limitation to the present invention.

FIG. 2 is a schematic diagram of Spearman correlation coefficients between different sensors in a boiler according to one or more embodiments of the present invention;

DETAILED DESCRIPTION

Figure 1:
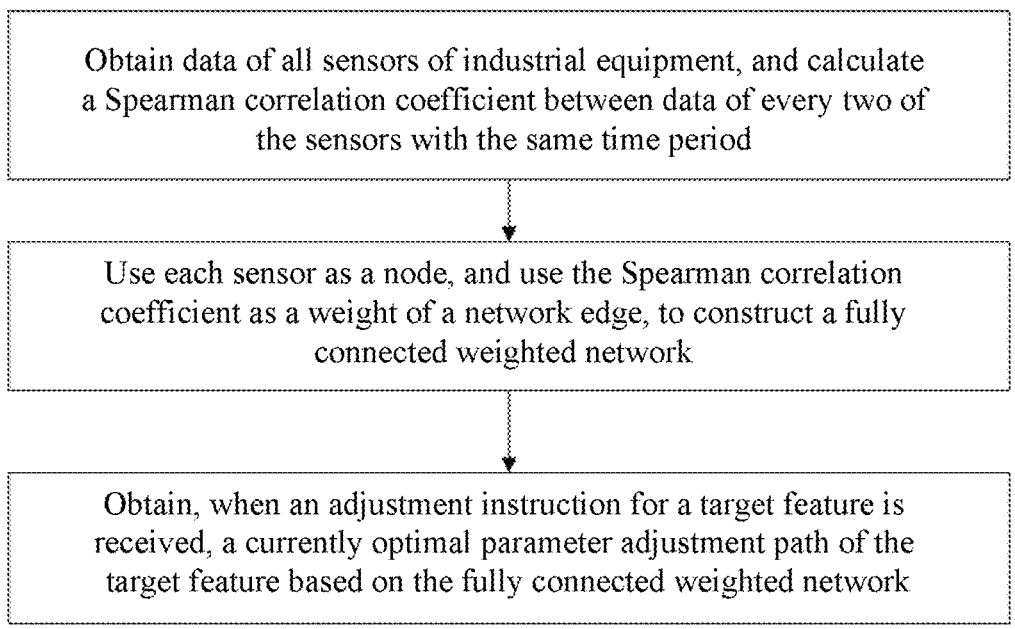
FIG. 1 is a flowchart of an industrial equipment operation, maintenance and optimization method based on a complex network model according to one or more embodiments of the present invention.
Figure 3:
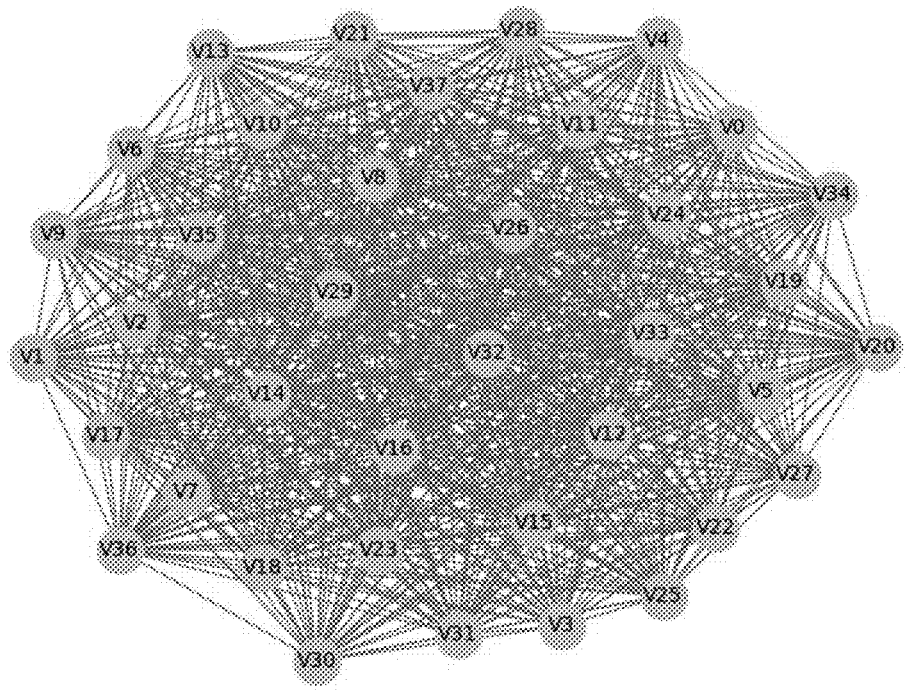
FIG. 3 is a schematic diagram of a complex network model of a boiler according to one or more embodiments of the present invention.
Figure 4:
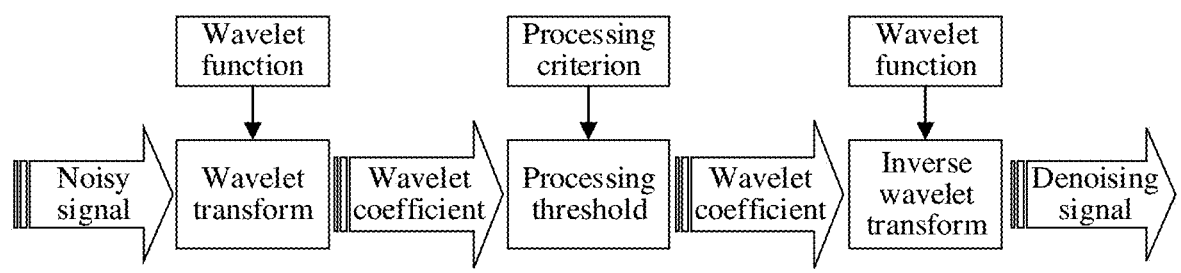
FIG. 4 is a flowchart of wavelet analysis according to one or more embodiments of the present invention.

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. For example, unless otherwise specified in the context, singular forms are also intended to include plural forms. In addition, it should be further understood that, when the terms "comprise" and/or "include" are used in this specification, it indicates that there is a feature, a step, an operation, a device, a component, and/or a combination thereof.

The embodiments in the present invention and features in the embodiments may be mutually combined in case that no conflict occurs.

Interpretation of Terms:

A complex network is a network presenting high complexity and the complexity is mainly represented in the following aspects: (1) a complex structure, represented by a large quantity of nodes, and that the network presents a plurality of different features; (2) network evolution, represented by generation and disappearance of nodes or connections; (3) connection diversity: there are differences in connection weights between nodes, and the connection may be directional; (4) dynamic complexity: a node set may belong to the nonlinear dynamic system, for example, a status of the node changes complexly with time; (5) node diversity: nodes in a complex network may represent anything; and (6) multi-complexity integration, that is, the foregoing multi-complexities affect each other.

Wavelet analysis is a multi-resolution analysis method in which an adaptive operation can be simultaneously performed in time domain and frequency domain. During wavelet analysis, a signal (function) is gradually divided by using a scaling and translation operation, to finally achieve time division at a high frequency and frequency division at a low frequency, and automatically adapt to a requirement of time-frequency signal analysis, to focus on any detail of the signal.

The Spearman correlation coefficient is also referred to as the Spearman rank correlation coefficient. "Rank" may be understood as a sequence or sorting order, which indicates solution according to a sorting position of raw data. This type of representation form has no limitations as those when a Pearson correlation coefficient is calculated.

Mathematically, the Spearman correlation coefficient is a coefficient that measures an individual correlation between two columns of variables, and is irrelevant to a specific value of the variable and is only related to a relative relationship (size sorting) between the variables. The Spearman correlation coefficient is used herein as a weight of a node edge in a network model.

A support vector machine is a binary classification model of which a purpose is to find a hyperplane to segment samples. A principle of segmentation is interval maximization, which is finally transformed into a convex quadratic programming problem to solve. When a training sample is linearly separable, a linearly separable support vector machine is learned through hard interval maximization; when the training sample is approximately linearly separable, a linear support vector machine is learned through soft interval maximization; when the training sample is linearly inseparable, a nonlinear support vector machine is learned through core techniques and soft interval maximization.

Embodiment 1

This embodiment discloses an industrial equipment operation, maintenance and optimization method based on a complex network model. As shown in FIG. 1, the method includes the following steps:

Step 1: Obtain data of all sensors of industrial equipment, and calculate a Spearman correlation coefficient between data of every two of the sensors.

Different sensors on the same equipment are used as nodes of a network, and a Spearman correlation coefficient between data of the sensors within the same time period is used as a weight of a network edge, to construct a fully connected weighted complex network oriented to data. Descriptions are provided by using a boiler in a thermal power generation scenario as an example. In the thermal power generation production scenario, fuel heats water to generate steam when the fuel is burned. The steam pressure drives a turbine to rotate, and then the turbine drives a generator to rotate to generate electricity. In this series of energy conversion, the core that affects the efficiency of power generation is the combustion efficiency of the boiler, that is, fuel is burned to heat water, to generate high temperature and high pressure steam. There are many factors affecting the combustion efficiency of the boiler, including adjustable parameters of the boiler, such as a combustion feed rate, primary and secondary air, induced air, return air, and water supply; and working conditions of the boiler, such as boiler temperature and pressure, furnace temperature and pressure, and a superheater temperature. Relevant data of the foregoing influencing factors may be acquired by using corresponding sensors.

Step 1 specifically includes:

Step 1.1: Select a network node, specifically, select all sensors of the boiler as the network nodes.

Step 1.2: Select a same time period t, and summarize data collected by the sensors, a first column of data being data collected by a first sensor V0, a second column of data being data collected by a second sensor V1, and so on. A data set $V=[V_0, V_1 \ldots V_n]$ of working states of all the sensors of the boiler may be obtained, where $V_i$ represents a sensor name on the boiler.

Step 1.3: Process missing data, specifically, process a data sequence returned from each sensor as a time sequence, and in these sequences, if a value of a sequence at a moment is NULL (that is, the sensor is abnormal at the moment and does not capture data), delete data of all the sequences at the moment regardless of whether other sequences have acquired data at the moment. In this way, the missing data is invalidated to facilitate subsequent mining of association rules.

Step 1.4: Process the noise, specifically, denoise each signal by using one layer of db4 wavelet, so that most of the signal noise can be filtered out after wavelet transform.

The wavelet transform is performed by using the following formula, where $\alpha$ is a scale, and $\tau$ is a translation amount:

$$WT(\alpha, \tau) = \frac{1}{\sqrt{\alpha}} \int_{-\infty}^{\infty} f(t) * \varphi\left(\frac{t-\tau}{\alpha}\right) dt$$

Step 1.5: Process a data distribution difference, where the data distribution difference is processed by using a Spearman correlation coefficient this time, and analyze a correlation between the data. Correlation coefficients between the sensors are calculated by using the Spearman correlation coefficient according to the data set V constructed in step 1.2, and a calculation formula is as follows:

$$\rho = 1 - \frac{6\sum_{k=1}^{N} d_i^2}{N(N^2-1)}$$

A correlation coefficient matrix A may be obtained through calculation.

A specific calculation process is provided below by using a correlation between the signal $V_0$ and the signal $V_1$ as an example:

(1) Data of the column $V_0$ and the column $V_1$ is sorted according to a data size, to obtain data sets $V_0^*$ and $V_1^*$, where $V_0^*=[v_0^0, v_1^0, \ldots, v_n^0]$, and then a new column $x_i=[1, 2, 3, \ldots, n]$ is created to assign data of $V_0^*$ a level value. Similarly, $V_1^*=[v_0^1, v_1^1, \ldots, v_n^1]$ and a level value sequence $y_i=[1, 2, 3, \ldots, n]$ of $V_1^*$ may be obtained.

(2) Further, $d_i^2$ may be obtained through calculation:

$$d_1^2 = (x_1 - y_1)^2$$
$$d_2^2 = (x_2 - y_2)^2$$
$$\ldots$$
$$d_n^2 = (x_n - y_n)^2$$

(3) Finally, a correlation coefficient $$\rho_{0-1} = 1 - \frac{6(d_1^2 + d_2^2 + \ldots + d_n^2)}{n(n^2-1)}$$

between the signal $V_0$ and the signal $V_1$ may be obtained through calculation.

By analogy, a correlation coefficient $\rho$ between the other sensors may be separately calculated.

Step 1.6: For each piece of sensor data, remove sensor data of which a correlation with the sensor data is less than a specified threshold. For example, a feature (sensor) of which a correlation coefficient is less than 0.1 is removed.

Step 2: Use each sensor as a node, and use the Spearman correlation coefficient between data of the sensors within the same time period as a weight of a network edge, to construct a fully connected weighted network, as shown in FIG. 2.

Step 3: Perform appropriacy check on the correlation coefficient in the fully connected weighted complex network.

In this embodiment, appropriacy check is performed only on one or more features, specifically including the following steps: receiving a selection of a user for a production target, obtaining a correlation coefficient matrix between data of a sensor corresponding to the production target and data of another sensor, and checking appropriacy of the correlation coefficient based on a support vector regression model.

Step 3 specifically includes:

Step 3.1: Receive a selection of a user for a production target. Specifically, data of a sensor is selected as a main production target of the equipment according to actual service experience. Using the boiler as an example, a steam amount may be selected as the main production target. Then a correlation coefficient matrix A between data of a sensor corresponding to the production target and data of another sensor is obtained.

Step 3.2: Perform absolute value processing on the correlation coefficient matrix A to obtain a matrix B, and remove a feature (sensor) of which a correlation coefficient with the target is less than 0.1 by using the matrix B.

Step 3.3: Construct a prediction model by using a support vector regression algorithm according to remaining features in step 3.2, and predict the target value selected in step 3.1, where a prediction step is as follows:

After the correlation coefficient is obtained through calculation, the correlation between the sensors is checked by using a support vector machine model.

Main steps of the check are as follows:

(1) Divide the selected data into two parts: a training set and a test set.

(2) Perform cross validation by using data of the training set, to train the support vector machine model.

(3) Predict a target value by using data of the test set by using the trained model.

(4) Compare a predicted result with an actual result, and determine the quality of the predicted result by using a root mean square error.

A support vector regression (SVR) model in the support vector machine is selected to perform prediction, and a derivation formula thereof is as follows:

For a general regression problem, a training sample $D\{(x_1, y_1), (x_2, y_2), \ldots, (x_n, y_n)\}$, $y_i \in R$ is given, and $f(x)$ that is approximate to y to the greatest extent is expected to be learned, where $\omega$, b are to-be-determined parameters. In the model, a loss is zero only when $f(x)$ and y are completely the same. However, in the support vector regression model, it is assumed that a maximum deviation of $\epsilon$ between $f(x)$ and y can be tolerated, and a loss is calculated only when an absolute value of the difference between $f(x)$ and y is greater than $\epsilon$. In this case, it is equivalent to that an interval band with a width of $2\epsilon$ is constructed by using $f(x)$ as a center, and if the training sample falls within the interval band, it is considered that the training sample is predicted correctly.

Therefore, the SVR problem may be formalized as:

$$\min_{\omega,b} \frac{1}{2}\|\omega\|^2 + C\sum_{i=1}^{m} Ł_\epsilon(f(x_i) - y_i) \quad (3)$$

C is a regularization constant, and $Ł_\epsilon$ is an insensitive loss function of E and satisfies the following condition:

$$Ł_\epsilon(z) = \begin{cases} 0, & \text{if } |z| \le \epsilon \\ |z| - \epsilon, & \text{otherwise} \end{cases} \quad (4)$$

Further, slack variables $\epsilon$ and $\hat{\epsilon}$ may be introduced, and (4) is rewritten into the following form:

$$\min_{\omega,b,\varepsilon_i,\hat{\varepsilon}_i} \frac{1}{2}\|\omega\|^2 + C\sum_{i=1}^{m}(\varepsilon_i + \hat{\varepsilon}_i) \quad (5)$$

s.t. $f(x_i) - y_i \le \epsilon + \varepsilon_i,$ $y_i - f(x_i) \le \epsilon + \hat{\varepsilon}_i,$ $\varepsilon_i \ge 0, \hat{\varepsilon}_i \ge 0, i = 1, 2, \ldots, m.$ Then, a Lagrange multiplier is introduced, and a Lagrange function can be obtained by using the Lagrange multiplier method:

$$L(\omega, B, \alpha, \hat{\alpha}, \varepsilon, \hat{\varepsilon}, \mu, \hat{\mu}) = \quad (6)$$

$$\frac{1}{2}\|\omega\|^2 + C\sum_{i=1}^{m}(\varepsilon_i + \hat{\varepsilon}_i) - \sum_{i=1}^{m}\mu_i\varepsilon_i - $$

$$\sum_{i=1}^{m}\hat{\mu}_i\hat{\varepsilon}_i + \sum_{i=1}^{m}\alpha_i(f(x_i) - y_i - \epsilon - \varepsilon_i) + $$

$$\sum_{i=1}^{m}\hat{\alpha}_i(y_i - f(x_i) - \epsilon - \hat{\varepsilon}_i)$$

Further, a duality problem of SVR may be obtained:

$$\max_{\alpha,\hat{\alpha}} \sum_{i=1}^{m} y_i(\hat{\alpha}_i - \alpha_i) - \epsilon(\hat{\alpha}_i + \alpha_i) - \quad (7)$$

$$\frac{1}{2}\sum_{i=1}^{m}\sum_{j=1}^{m}(\hat{\alpha}_i - \alpha_i)(\hat{\alpha}_j - \alpha_j)x_i^T x_j$$

s.t. $\sum_{i=1}^{m}(\hat{\alpha}_i - \alpha_i) = 0,$ $0 \le \alpha_i, \hat{\alpha}_i \le C.$ When the foregoing condition meets KKT, it can be learned that $\alpha_i$ can take a non-zero value when and only when $f(x_i) - y_i - \epsilon - \varepsilon_i = 0$. Similarly, $\hat{\alpha}_i$ can take a non-zero value when and only when $y_i - f(x_i) - \epsilon - \hat{\varepsilon}_i = 0$. In other words, only when the sample $(x_i, y_i)$ does not fall within the interval band of $\epsilon$, the corresponding $\alpha_i$ and $\hat{\alpha}_i$ can take non-zero values. In addition, the foregoing constraints cannot be true at the same time. Therefore, at least one of $\alpha_i$ and $\hat{\alpha}_i$ is zero. Based on this, a resolvent of SVR may be obtained as follows:

$$f(x) = \sum_{i=1}^{m}(\hat{\alpha}_i - \alpha_i)x_i^T x + b \quad (8)$$

$$b = y_i + \epsilon - \sum_{i=1}^{m}(\hat{\alpha}_i - \alpha_i)x_i^T x \quad (9)$$

TABLE 1

| Model | Model prediction result | |
|---|---|---|
| | Training set mse | Test set mse |
| LinearSVR | 0.0961 | 0.1158 |

When the prediction result meets an expectation, it is considered that the Spearman correlation coefficient can well represent the correlation between the sensors of the boiler.

After the correlation check succeeds, sensors on the boiler equipment are selected as nodes of a complex network, and the Spearman correlation coefficient obtained through calculation is used as the weight of the network node edge, to construct the fully connected weighted complex network oriented to industrial big data.

Step 4: Obtain, when a parameter adjustment instruction for a target is received, a currently optimal parameter adjustment path of the target based on the fully connected weighted network.

The optimal parameter adjustment path includes features directly related to the production target and features indirectly related to the production target. This step is to perform association rule mining on the monitoring factors of the equipment. When the user needs to adjust the production target, a plurality of directly related features of which correlations with the production target are greater than a specified threshold are searched for based on the fully connected weighted network, and then a plurality of indirectly related features of which correlations with the plurality of directly related features are greater than a specified threshold are searched for separately. The directly related features, the indirectly related features, and the correlation coefficient are visualized for the user's reference. The visualization may be implemented in any existing visualization methods such as a tree form and an undirected graph, and this is not limited herein. The user may select a feature according to a visualization result, and adjust a corresponding parameter.

Embodiment 2

An objective of this embodiment is to provide an industrial equipment parameter adjustment path generation system based on a sensor network model.

To achieve the foregoing objective, the present invention uses the following technical solution:

This embodiment provides an industrial equipment parameter adjustment path generation system based on a sensor network model, including:

a data obtaining module, configured to obtain data of all sensors of industrial equipment;

a network construction module, configured to calculate a Spearman correlation coefficient between data of every two of the sensors within the same time period; use each sensor as a node, and use the Spearman correlation coefficient as a weight of a network edge, to construct a fully connected weighted network; and a parameter adjustment path generation module, configured to obtain, when an adjustment instruction for a target feature is received, a currently optimal parameter adjustment path of the target feature based on the fully connected weighted network.

Embodiment 3

An objective of this embodiment is to provide an electronic device.

An electronic device includes a memory, a processor, and a computer program stored in the memory and capable of running on the processor, when executing the program, the processor implementing the following steps, including:

obtaining data of all sensors of industrial equipment, and calculating a Spearman correlation coefficient between data of every two of the sensors within the same time period;

using each sensor as a node, and using the Spearman correlation coefficient as a weight of a network edge, to construct a fully connected weighted network; and obtaining, when an adjustment instruction for a target feature is received, a currently optimal parameter adjustment path of the target feature based on the fully connected weighted network.

Embodiment 4

An objective of this embodiment is to provide a computer-readable storage medium.

A computer-readable storage medium stores a computer program, when executed by a processor, the program implementing the following steps:

obtaining data of all sensors of industrial equipment, and calculating a Spearman correlation coefficient between data of every two of the sensors within the same time period;

using each sensor as a node, and using the Spearman correlation coefficient as a weight of a network edge, to construct a fully connected weighted network; and obtaining, when an adjustment instruction for a target feature is received, a currently optimal parameter adjustment path of the target feature based on the fully connected weighted network.

The steps involved in the foregoing Embodiment 2, Embodiment 3, and Embodiment 4 correspond to Embodiment 1. For a specific implementation, refer to related descriptions of Embodiment 1. The term "computer-readable storage medium" should be understood as a single medium or a plurality of media including one or more instruction sets, and should also be understood as including any medium. The any medium can store, encode, or carry an instruction set used for being executed by a processor, and cause the processor to perform any method in the present invention.

The foregoing one or more embodiments have the following technical effects:

In the present invention, production equipment in reality is digitized by using industrial big data, to construct a complex network oriented to the industrial big data, and various factors of the equipment are connected. By using the network, an optimal path for equipment parameter tuning may be found by traversing paths on the network, thereby reducing dependence of an enterprise on a domain expert.

In the model constructed in the present invention, a correlation between data is calculated by using a Spearman correlation coefficient. In this way, an overall distribution of data and a sample size can be well ignored, to resolve problems of the industrial big data in these aspects. In addition, the model is completely data-driven, so that an impact of service knowledge on the data model is greatly eliminated.

A person skilled in the art should understand that the modules or steps in the present invention may be implemented by using a general-purpose computer apparatus. Optionally, they may be implemented by using program code executable by a computing apparatus, so that they may be stored in a storage apparatus and executed by the computing apparatus. Alternatively, the modules or steps are respectively manufactured into various integrated circuit modules, or a plurality of modules or steps thereof are manufactured into a single integrated circuit module. The present invention is not limited to any specific combination of hardware and software.

The foregoing descriptions are merely preferred embodiments of the present invention, but are not intended to limit the present invention. A person skilled in the art may make various alterations and variations to the present invention. Any modification, equivalent replacement, or improvement made within the spirit and principle of the present invention shall fall within the protection scope of the present invention.

Although the foregoing describes specific implementations of the present invention with reference to the accompanying drawings, the protection scope of the present invention is not limited. A person skilled in the art should understand that, based on the technical solutions of the present invention, various modifications or variations made by a person skilled in the art without creative efforts shall still fall within the protection scope of the present invention.

What is claimed is:

1. An industrial equipment operation, maintenance and optimization method based on a complex network model, comprising the following steps:

obtaining data of all sensors of industrial equipment, and calculating a Spearman correlation coefficient between data of every two of the sensors within a same time period;

using each sensor as a node, and using the Spearman correlation coefficient as a weight of a network edge, to construct a fully connected weighted network;

obtaining, when a parameter adjustment instruction for a feature of a production target is received, a currently optimal parameter adjustment path for the feature of the production target based on the fully connected weighted network; and performing an appropriacy check by:
receiving a selection of a user for the production target,
obtaining a correlation coefficient matrix between data of a sensor of the industrial equipment corresponding to the production target and data of another sensor,
removing a sensor of which a correlation with the sensor corresponding to the production target is less than a specified threshold, and
checking appropriacy of the correlation coefficient based on a support vector regression model according to data of remaining sensors, wherein the currently optimal parameter adjustment path is obtained by searching, based on the fully connected weighted network, for at least one directly related feature and at least one indirectly related feature of which correlations with the feature of the production target are greater than a specified threshold, and visualizing the at least one directly related feature, the at least one indirectly related feature, and correlation coefficients therebetween, and the feature of the production target is selected by the user according to a result of the visualization, and at least one corresponding parameter is adjusted.

2. The industrial equipment operation, maintenance and optimization method according to claim 1, wherein after the data of all the sensors of the industrial equipment is obtained, missing data processing and noise processing are further performed.

3. The industrial equipment operation, maintenance and optimization method according to claim 1, wherein a method for calculating a Spearman correlation coefficient between data $V_0$ and $V_1$ of two sensors is:
  sorting the data $V_0$ and $V_1$ ccording to a data size, to obtain data sets $V_0^*$ and $V_1^*$, creating a new column $x_i=[1,2,3,\ldots,n]$ to assign data of $V_0^*$ a level value, and creating a new column $y_i=[1,2,3,\ldots,n]$ to assign data of $V_1^*$ a level value, wherein
  the Spearman correlation coefficient between $V_0$ and $V_1$ is:

$$\rho_{0-1} = 1 - \frac{6(d_1^2 + d_2^2 + \ldots + d_n^2)}{n(n^2-1)}, \text{ wherein}$$

$$d_i^2 = (x_i - y_i)^2.$$

4. The industrial equipment operation, maintenance and optimization method according to claim 1, wherein after the Spearman correlation coefficient between the data of every two of the sensors within the same time period is calculated, each sensor, having a correlation with another sensor that is less than the specified threshold is removed.

5. The industrial equipment operation, maintenance and optimization method according to claim 1, wherein the checking the appropriacy of the correlation coefficient based on athe support vector regression model comprises:
  dividing the data of the remaining sensors into two parts: a training set and a test set;
  training the support vector regression model based on the training set by using a value of the production target as an output and using the data of another sensor as an input;
  predicting, based on the test set, the production target by using the support vector regression model; and
  determining, according to a predicted value and an actual value of the production target, whether a predicted result reaches expectation, and if yes, determining that the correlation coefficient is appropriate.

6. An industrial equipment parameter adjustment path generation system based on a complex network model, comprising circuitry configured to:
  obtain data of all sensors of industrial equipment; and
  calculate a Spearman correlation coefficient between data of every two of the sensors within a same time period;
  use each sensor as a node, and use the Spearman correlation coefficient as a weight of a network edge, to construct a fully connected weighted network;
  obtain, when a parameter adjustment instruction for a feature of a production target is received, a currently optimal parameter adjustment path for the target feature of the production target based on the fully connected weighted network; and
  perform an appropriacy check by:
    receiving a selection of a user for the production target,
    obtaining a correlation coefficient matrix between data of a sensor of the industrial equipment corresponding to the production target and data of another sensor,
    removing a sensor of which a correlation with the sensor corresponding to the production target is less than a specified threshold, and
    checking appropriacy of the correlation coefficient based on a support vector regression model according to data of remaining sensors,
  wherein the currently optimal parameter adjustment path is obtained by searching, based on the fully connected weighted network, for at least one directly related feature and at least one indirectly related feature of which correlations with the feature of the production target are greater than a specified threshold, and visualizing the at least one directly related feature, the at least one indirectly related feature, and correlation coefficients therebetween, and
  the feature of the production target is selected by the user according to a result of the visualization, and at least one corresponding parameter is adjusted.

7. An electronic device, comprising a memory, a processor, and a computer program stored in the memory and capable of running on the processor, when executing the program, the processor implementing the industrial equipment operation, maintenance and optimization method based on a complex network model according to claim 1.

8. A non-transitory computer-readable storage medium, storing a computer program, when executed by a processor, the program implementing the industrial equipment operation, maintenance and optimization method based on a complex network model according to claim 1.

* * * * *